United States Patent
Uchide

(10) Patent No.: US 12,423,342 B2
(45) Date of Patent: Sep. 23, 2025

(54) SEMANTIC RELATIONSHIP LEARNING DEVICE, SEMANTIC RELATIONSHIP LEARNING METHOD, AND STORAGE MEDIUM STORING SEMANTIC RELATIONSHIP LEARNING PROGRAM

(71) Applicant: MITSUBISHI ELECTRIC CORPORATION, Tokyo (JP)

(72) Inventor: Hayato Uchide, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 1040 days.

(21) Appl. No.: 17/347,893

(22) Filed: Jun. 15, 2021

(65) Prior Publication Data

US 2021/0312333 A1    Oct. 7, 2021

Related U.S. Application Data

(63) Continuation of application No. PCT/JP2019/000173, filed on Jan. 8, 2019.

(51) Int. Cl.
*G06N 20/00*    (2019.01)
*G06F 16/334*    (2025.01)
(Continued)

(52) U.S. Cl.
CPC .......... *G06F 16/3344* (2019.01); *G06F 18/22* (2023.01); *G06F 18/2413* (2023.01); *G06F 40/30* (2020.01); *G06N 20/00* (2019.01)

(58) Field of Classification Search
CPC .. G06F 16/3344; G06F 18/22; G06F 18/2413; G06F 40/30; G06F 16/35;
(Continued)

(56) References Cited

U.S. PATENT DOCUMENTS

2003/0083859 A1* 5/2003 Murata ............... G06F 40/20
704/1
2012/0330976 A1* 12/2012 Tsuchida ............ G06F 40/247
707/E17.084

(Continued)

FOREIGN PATENT DOCUMENTS

| CN | 104137102 A | 11/2014 |
| CN | 107949841 A | 4/2018 |
| JP | 2014-119988 A | 6/2014 |

OTHER PUBLICATIONS

Chinese Office Action and Search Report for Chinese Application No. 201980087410.5, dated Feb. 1, 2024, with English translation.
(Continued)

*Primary Examiner* — Abul K Azad
(74) *Attorney, Agent, or Firm* — Birch, Stewart, Kolasch & Birch, LLP

(57) ABSTRACT

A semantic relationship learning device includes processing circuitry to acquire positive example data pairs and to generate negative example data pairs by combining the language data, each of the negative example data pairs being formed with language data that are not in the predetermined semantic relationship with each other; to extract feature values from the negative example data pairs; to calculate a similarity level between the feature values; to classify the negative example data pairs into predetermined similarity level ranges or classifies learning-purposed negative example data pairs into predetermined similarity level ranges, thereby generating learning-purposed negative example data sets corresponding to the similarity level ranges; to select a learning-purposed negative example data set from the learning-purposed negative example data sets in an order according to a selection schedule; and to perform a machine learning process by using the selected learning-
(Continued)

purposed negative example data set and the positive example data pairs.

11 Claims, 10 Drawing Sheets

(51) Int. Cl.
*G06F 18/22* (2023.01)
*G06F 18/2413* (2023.01)
*G06F 40/30* (2020.01)

(58) Field of Classification Search
CPC .......... G06N 20/00; G06N 20/10; G06N 3/08; G06N 5/02
See application file for complete search history.

(56) References Cited

U.S. PATENT DOCUMENTS

| | | | | |
|---|---|---|---|---|
| 2013/0268260 | A1* | 10/2013 | Lundberg | G06F 11/3664 704/8 |
| 2015/0026106 | A1 | 1/2015 | Oh et al. | |
| 2018/0246953 | A1 | 8/2018 | Oh et al. | |
| 2019/0130030 | A1* | 5/2019 | Iguchi | G06F 40/30 |
| 2020/0134422 | A1* | 4/2020 | Gliozzo | G06F 40/30 |
| 2024/0127575 | A1* | 4/2024 | Gokalp | G06F 18/2113 |

OTHER PUBLICATIONS

Mikolov et al., "Efficient Estimation of Word Representations in Vector Space", ICLR(International Conference on Learning Representations), 2013, pp. 1-12.
Bengio et al., "Curriculum Learning," Proceedings of the 26th International Conference on Machine Learning, 2009, pp. 41-48.
Chinese Office Action and Search Report for Chinese Application No. 201980087410.5, dated Aug. 20, 2024, with English translation.
Aggarwal, "Neural Networks and Deep Learning—A Textbook," Springer, 2018, 49 pages total.
Collobert et al., "A Unified Architecture for Natural Language Processing: Deep Neural Networks with Multitask Learning," Proceedings of the 25th International Conference on Machine Learning, 2008, pp. 160-167.
German Office Action for German Application No. 112019006005.8, dated Jul. 13, 2023, with an English translation.
Goodfellow et al., "Deep Learning," MIT Press, 2016, 13 pages total, URL: <https://www.deeplearningbook.org/>.
Summons to Attend Oral Proceedings for German Application No. 112019006005.8, dated Nov. 19, 2024, with an English translation.
Chen, "String Metrics and Word Similarity Applied to Information Retrieval," University of Eastern Finland, School of Computing, Master Thesis, 2012, 60 pages total.
German Office Action for German Application No. 11 2019 006 005.8, dated May 13, 2025, with English translation.

* cited by examiner

SEMANTIC RELATIONSHIP LEARNING DEVICE, SEMANTIC RELATIONSHIP LEARNING METHOD, AND STORAGE MEDIUM STORING SEMANTIC RELATIONSHIP LEARNING PROGRAM

CROSS-REFERENCE TO RELATED APPLICATION

This application is a continuation application of International Application No. PCT/JP2019/000173 having an international filing date of Jan. 8, 2019.

BACKGROUND OF THE INVENTION

1. Field of the Invention

The present invention relates to a semantic relationship learning device that performs machine learning and a semantic relationship learning method and a semantic relationship learning program used for performing the machine learning.

2. Description of the Related Art

With the prevalence of personal computers and the Internet, the amount of electronic data accessible to users is increasing. Thus, a technology for efficiently finding desired data in large-scale electronic data is being requested. In the field of natural language processing, in order to search for a paraphrased sentence (i.e., a sentence that is semantically equivalent), a learning device, statistically machine-learning semantic relationships between texts by using training data previously generated manually as positive examples each being a pair of texts in a synonymous relationship and negative examples each being a pair of texts not in the synonymous relationship, is used. By using the result of the machine learning, it is possible to search for and estimate a text that is in the synonymous relationship with an inputted text.

For example, Patent Reference 1 proposes a device that performs a synonymy judgment process on predicates included in sentences. This device regards each pair of predicates having the same meaning as each other (i.e., example of texts in the synonymous relationship with each other) as a positive example, regards each pair of predicates having meanings different from each other (i.e., example of texts not in the synonymous relationship with each other) as a negative example, performs a machine learning process by using the positive examples and the negative examples as training data, and consequently acquires a judgment model to be used for the synonymy judgment process.

Patent Reference 1: Japanese Patent Application Publication No. 2014-119988

However, in the negative examples used for the machine learning process performed by the aforementioned device, it is conceivable that negative examples formed with language data having extremely close meanings and negative examples formed with language data having meanings extremely far meanings are not discriminated from each other and are mixed together. Therefore, it is difficult to acquire a discrimination model that enables excellent semantic relationship discrimination by performing a machine learning process using such negative examples as training data.

SUMMARY OF THE INVENTION

An object of the present invention, which has been made to resolve the above-described problem with the conventional technology, is to provide a semantic relationship learning device capable of performing a machine learning process that enables excellent semantic relationship discrimination, and a semantic relationship learning method and a semantic relationship learning program used for performing a machine learning process that enables excellent semantic relationship discrimination.

A semantic relationship learning device according to an aspect of the present invention includes: processing circuitry to acquire a plurality of positive example data pairs each of which is formed with language data that are in a predetermined semantic relationship with each other from a positive example data storage storing the plurality of positive example data pairs and to generate a plurality of negative example data pairs by combining the language data, each of the plurality of negative example data pairs being formed with language data that are not in the predetermined semantic relationship with each other; to extract feature values from the language data constituting each of the plurality of negative example data pairs; to calculate a similarity level between the feature values of the language data in each of the plurality of negative example data pairs; to classify the plurality of negative example data pairs into a plurality of predetermined similarity level ranges based on the similarity level or classifies a plurality of learning-purposed negative example data pairs generated from the language data constituting the plurality of negative example data pairs and the language data constituting the plurality of positive example data pairs into a plurality of predetermined similarity level ranges based on the similarity level, thereby generating a plurality of learning-purposed negative example data sets corresponding to the plurality of similarity level ranges, each of the plurality of learning-purposed negative example data sets including one or more negative example data pairs among the plurality of negative example data pairs; to select a learning-purposed negative example data set from the plurality of learning-purposed negative example data sets in an order according to a selection schedule predetermined based on the plurality of similarity level ranges; and to perform a machine learning process by using the selected learning-purposed negative example data set and the plurality of positive example data pairs.

A semantic relationship learning method according to an aspect of the present invention includes: acquiring a plurality of positive example data pairs each of which is formed with language data that are in a predetermined semantic relationship with each other from a positive example data storage unit that stores the plurality of positive example data pairs and generating a plurality of negative example data pairs by combining the language data, each of the plurality of negative example data pairs being formed with language data that are not in the predetermined semantic relationship with each other; extracting feature values from the language data constituting each of the plurality of negative example data pairs; calculating a similarity level between the feature values of the language data in each of the plurality of negative example data pairs; classifying the plurality of negative example data pairs into a plurality of predetermined similarity level ranges based on the similarity level or classifying a plurality of learning-purposed negative example data pairs generated from the language data constituting the plurality of negative example data pairs and the language data constituting the plurality of positive example data pairs into a plurality of predetermined similarity level ranges based on the similarity level, thereby generating a plurality of learning-purposed negative example data sets corresponding to the plurality of similarity level ranges, each of the plurality of learning-purposed negative example data sets including one or more negative example data pairs among the plurality of negative example data pairs; selecting a learning-purposed negative example data set from the plurality of learning-purposed negative example data sets in an order according to a selection schedule predetermined based on the plurality of similarity level ranges; and performing a machine learning process by using the selected learning-purposed negative example data set and the plurality of positive example data pairs.

According to the present invention, it is possible to perform a machine learning process that enables excellent semantic relationship discrimination.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A semantic relationship learning device, a semantic relationship learning method and a semantic relationship learning program according to each embodiment of the present invention will be described below with reference to the drawings. Incidentally, the following embodiments are just examples and a variety of modifications are possible within the scope of the present invention.

The semantic relationship learning device according to each embodiment is a learning device that can be installed in a semantic relationship discrimination device including a semantic relationship discrimination unit that performs a semantic relationship discrimination process. The semantic relationship learning method according to each embodiment is a learning method for acquiring a semantic relationship discrimination model to be used in the semantic relationship discrimination process. The semantic relationship learning program according to each embodiment is a software program for acquiring the semantic relationship discrimination model to be used in the semantic relationship discrimination process.

(1) First Embodiment (1-1) Configuration of First Embodiment

Figure 1:
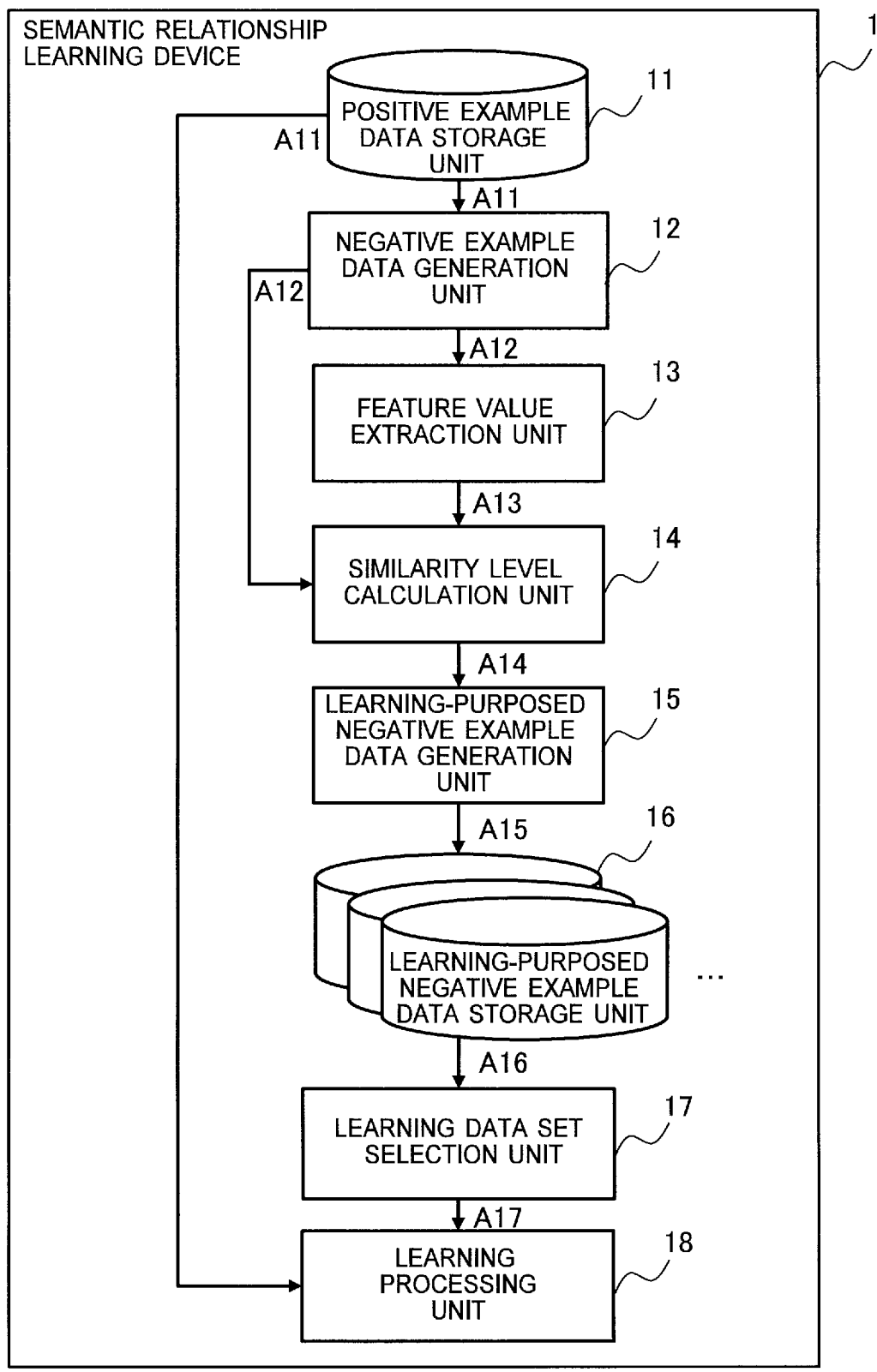
FIG. 1 is a functional block diagram schematically showing a configuration of a semantic relationship learning device according to a first embodiment of the present invention.

FIG. 1 is a functional block diagram schematically showing a configuration of a semantic relationship learning device 1 according to a first embodiment of the present invention. The semantic relationship learning device 1 is a device capable of executing a semantic relationship learning method according to the first embodiment. As shown in FIG. 1, the semantic relationship learning device 1 includes a negative example data generation unit 12, a feature value extraction unit 13, a similarity level calculation unit 14, a learning-purposed negative example data generation unit 15, a learning data set selection unit 17 and a learning processing unit 18. Further, the semantic relationship learning device 1 may include a positive example data storage unit (i.e., a positive example data storage) 11 and a learning-purposed negative example data storage unit (i.e., a learning-purposed negative example data storage) 16.

The positive example data storage unit 11 stores a plurality of positive example data pairs (hereinafter referred to also as "positive examples") A11. Each of the plurality of positive example data pairs is formed with data regarding a language (hereinafter referred to also as "language data") that are in a predetermined semantic relationship with each other. In the first embodiment, the predetermined semantic relationship is the synonymous relationship. The pair of language data in the synonymous relationship with each other is, for example, a pair of texts in the synonymous relationship with each other. Here, the text can be a word, a sentence or the like. Incidentally, the predetermined semantic relationship is not limited to the synonymous relationship.

The negative example data generation unit 12 acquires the plurality of positive example data pairs A11 stored in the positive example data storage unit 11. The negative example data generation unit 12 generates a plurality of negative example data pairs (hereinafter referred to also as "negative examples") A12 by combining language data included in the language data constituting the plurality of positive example data pairs A11. Each of the plurality of negative example data pairs A12 is formed with language data that are not in the predetermined semantic relationship with each other. In the first embodiment, each of the plurality of negative example data pairs A12 is formed with language data that are not in the synonymous relationship with each other. The pair of language data not in the synonymous relationship with each other is, for example, a pair of texts not in the synonymous relationship with each other. Here, the text can be a word, a sentence or the like.

The feature value extraction unit 13 extracts, namely, calculates, feature values A13 from the language data constituting each of the plurality of negative example data pairs A12 generated by the negative example data generation unit 12. As the feature value, it is possible to use a feature value that is suitable for the similarity level used, properties of the language data, etc. For example, in cases where the language data constituting a negative example data pair are text data, it is possible to use one or more of the length of the text, a character type of the text, the result of morphological analysis of the text, the result of dependency parsing of the text, a multidimensional vector obtained by conversion of the text, and so forth as the feature value for the calculation of the similarity level between texts. The method of converting a text into a multidimensional vector is publicly known, and a method described in Non-patent Reference 1 can be used, for example.

Non-patent Reference 1: Tomas Mikolov and three others, "Efficient Estimation of Word Representations in Vector Space", ICLR (International Conference on Learning Representations) 2013

The similarity level calculation unit 14 calculates the similarity level between the feature values A13 in each of the plurality of negative example data pairs A12. The similarity level calculation unit 14 assigns the calculated similarity level to the negative example data pair A12 corresponding to the similarity level and thereby generates a similarity level-assigned negative example data pair A14.

As the similarity level, a similarity level previously defined depending on the properties of the language data can be used. For example, in cases where the language data constituting the negative example data pair are text data, it is possible to use one or more of text length difference between the texts, edit distance (i.e., Levenshtein distance) between the texts, an overlapping degree between word sequences obtained by performing the morphological analysis on the texts, the overlapping degree in units of clauses obtained as the result of performing the dependency parsing on the texts, the overlapping degree between dependency relationships obtained as the result of performing the dependency parsing on the texts, the Euclidean distance or the cosine similarity between multidimensional vectors obtained by the conversion of the texts, and so forth.

For example, the similarity level becomes higher with the decrease in the text length difference between the texts. The similarity level becomes higher with the decrease in the edit distance between the texts. The similarity level becomes higher with the increase in the overlapping degree between the word sequences obtained by performing the morphological analysis on the texts. The similarity level becomes higher with the increase in the overlapping degree in units of clauses obtained as the result of performing the dependency parsing on the texts. The similarity level becomes higher with the increase in the overlapping degree between the dependency relationships obtained as the result of performing the dependency parsing on the texts. The similarity level becomes higher with the decrease in the Euclidean distance between the multidimensional vectors obtained by the conversion of the texts. The method of converting a text into a multidimensional vector is publicly known, and the method described in the Non-patent Reference 1 can be used, for example. The cosine similarity is used for comparing documents in a vector space model, and the method of calculating the cosine similarity is publicly known. It is also possible to use a discrimination result outputted by a previously prepared learning device, such as likelihood, as the similarity level.

The learning-purposed negative example data generation unit 15 classifies the plurality of negative example data pairs A14 into a plurality of predetermined similarity level ranges based on the negative example data pairs A14 to which the similarity levels calculated by the similarity level calculation unit 14 have been assigned and thereby generates a plurality of learning-purposed negative example data sets A15 corresponding to the plurality of similarity level ranges. Each of the plurality of learning-purposed negative example data sets A15 includes one or more negative example data pairs among the plurality of similarity level-assigned negative example data pairs A14.

For example, in cases where the negative example data pairs are text pairs and the similarity level is the Euclidean distance between texts that have been converted to vectors, the learning-purposed negative example data generation unit 15 classifies the texts generated by the negative example data generation unit 12 based on the Euclidean distance calculated by the similarity level calculation unit 14 and thereby generates the learning-purposed negative example data sets A15 classified into ranges of the Euclidean distance calculated by the similarity level calculation unit 14. Here, the ranges of the Euclidean distance d1 as the similarity level ranges are, for example, a first similarity level range as a range of $0.1 \leq d1 < 0.3$, a second similarity level range as a range of $0.3 \leq d1 < 0.5$, and a third similarity level range as a range of $0.5 \leq d1 \leq 0.7$. This example is an example of a case where the negative example data pairs are classified into three data sets corresponding to the similarity level ranges. Incidentally, the widths of the similarity level ranges of the learning-purposed negative example data sets generated and the number of the similarity level ranges are not limited to the above-described example.

The learning-purposed negative example data storage unit 16 receives the plurality of learning-purposed negative example data sets A15 corresponding to the plurality of similarity level ranges generated by the learning-purposed negative example data generation unit 15, and stores the plurality of learning-purposed negative example data sets A15 as a plurality of learning-purposed negative example data sets A16.

The learning data set selection unit 17 selects a learning-purposed negative example data set A17 from the plurality of learning-purposed negative example data sets A16 stored in the learning-purposed negative example data storage unit 16 in an order according to a selection schedule predetermined based on the plurality of similarity level ranges.

Specifically, the learning data set selection unit 17 successively outputs the learning-purposed negative example data sets to the learning processing unit 18, starting from a learning-purposed negative example data set whose similarity level of the similarity level range is low, and the learning process in the learning processing unit 18 is executed. When one learning process is over, a learning-purposed negative example data set whose similarity level is higher is subsequently outputted to the learning processing unit 18 and the process is repeated in the same order until the selection schedule of the learning-purposed negative example data sets is over.

Put another way, the learning data set selection unit 17 determines the selection schedule so that a learning-purposed negative example data set corresponding to a similarity level range having the lowest (i.e., minimum) value among the plurality of similarity level ranges is selected first and subsequently a learning-purposed negative example data set corresponding to a similarity level range having the second lowest value among the plurality of similarity level ranges is selected second. Namely, let n represent an integer larger than or equal to 1, the learning data set selection unit 17 determines the selection schedule so that a learning-purposed negative example data set corresponding to a similarity level range having the n-th lowest value among the plurality of similarity level ranges is selected n-th.

By starting the learning from a learning-purposed negative example data set whose similarity level is low and gradually learning learning-purposed negative example data sets whose similarity levels are higher as above, the semantic relationship learning device can quickly converge on a good solution. Further, generalization performance of the semantic relationship discrimination model obtained by the semantic relationship learning device can be improved. Incidentally, in the selection schedule of the learning-purposed negative example data sets, an arbitrary number of times of the learning may be set. It is also possible to use the result of optimization by means of Bayesian optimization or the like for the determination of the selection schedule of the learning-purposed negative example data sets in order to achieve the highest accuracy of the semantic relationship learning device.

Specifically, in the learning for the semantic relationship discrimination of electronic data, negative example data pairs obtained in consideration of the similarity level are prepared previously, learning with an easy problem setting at a low difficulty level (e.g., problem using a negative example data pair formed with language data whose similarity level is low) is performed first, and learning with a problem setting at a high difficulty level (e.g., problem using a negative example data pair formed with language data whose similarity level is high) is performed later. With this method, the generalization performance of a semantic relationship discrimination device including the semantic relationship learning device 1 can be improved as well as enabling the semantic relationship learning device 1 to quickly converge on a good solution.

The learning processing unit 18 performs the machine learning process by using the learning-purposed negative example data set A17 selected by the learning data set selection unit 17 and the plurality of positive example data pairs A11 stored in the positive example data storage unit 11. Publicly known learning algorithm can be used for the machine learning process. SVM (Support Vector Machine), neural network, decision tree, etc. can be taken as examples of the usable algorithm.

Figure 2:
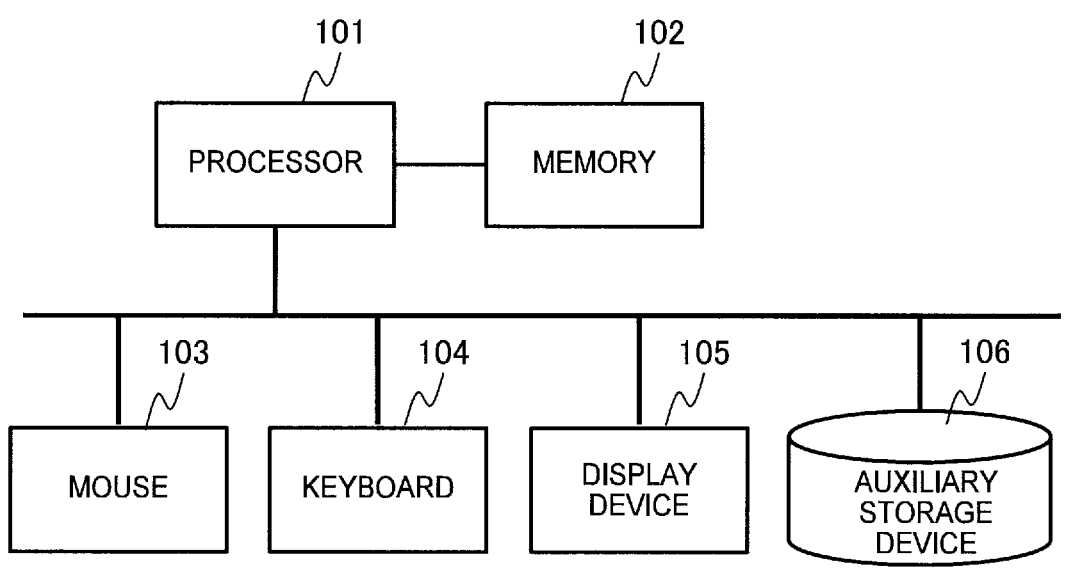
FIG. 2 is a diagram showing an example of a hardware configuration of the semantic relationship learning device according to the first embodiment.

FIG. 2 is a diagram showing an example of a hardware configuration of the semantic relationship learning device 1 according to the first embodiment. The semantic relationship learning device 1 may be implemented by processing circuitry. The processing circuitry includes, for example, a memory 102 as a storage device (i.e., a storage) that stores a program as software, namely, a semantic relationship learning program according to the first embodiment, and a processor 101 as an information processing unit that executes the program stored in the memory 102. The semantic relationship learning device 1 is a computer, for example. The semantic relationship learning program according to the first embodiment is stored in the memory 102 from a record medium (i.e., a non-transitory computer-readable storage medium) storing information via a reading device (not shown), or via a communication interface (not shown) connectable to the Internet or the like. Further, the semantic relationship learning device 1 may include an input device as a user operation unit such as a mouse 103 and a keyboard 104 and an output device such as a display device 105 for displaying images and an audio output unit (not shown) for outputting sound. Furthermore, the semantic relationship learning device 1 may include an auxiliary storage device (i.e., an auxiliary storage) 106 that stores various items of information such as a database. The auxiliary storage device 106 does not necessarily have to exist inside the semantic relationship learning device 1; the auxiliary storage device 106 can be a storage device existing in the cloud via a communication interface.

The negative example data generation unit 12, the feature value extraction unit 13, the similarity level calculation unit 14, the learning-purposed negative example data generation unit 15, the learning data set selection unit 17 and the learning processing unit 18 shown in FIG. 1 can be implemented by the processor 101 executing a program stored in the memory 102. Further, the positive example data storage unit 11 and the learning-purposed negative example data storage unit 16 shown in FIG. 1 can be a part of the auxiliary storage device 106.

(1-2) Operation of First Embodiment

Figure 3:
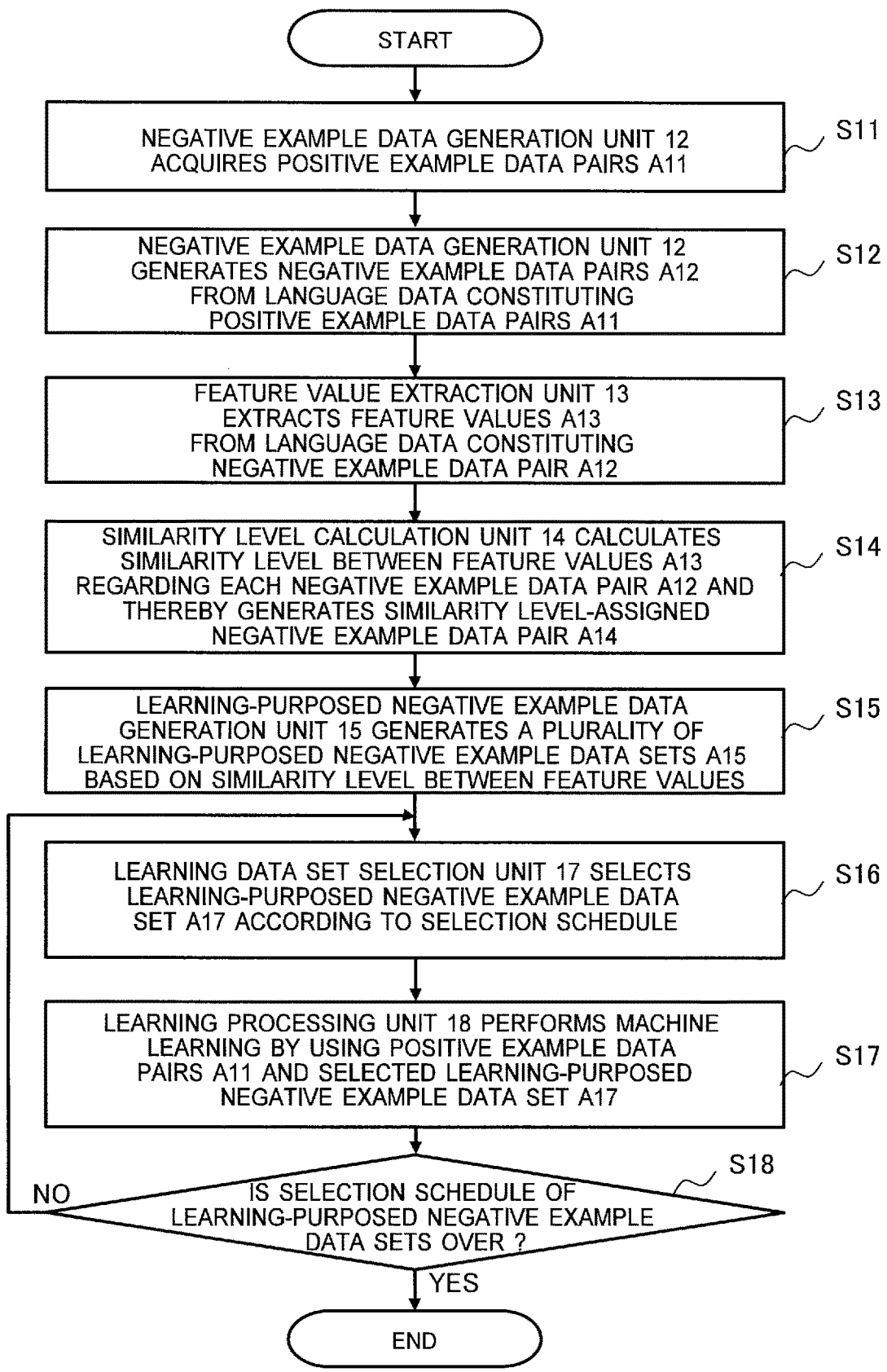
FIG. 3 is a flowchart showing an operation of the semantic relationship learning device according to the first embodiment.
Figure 4:
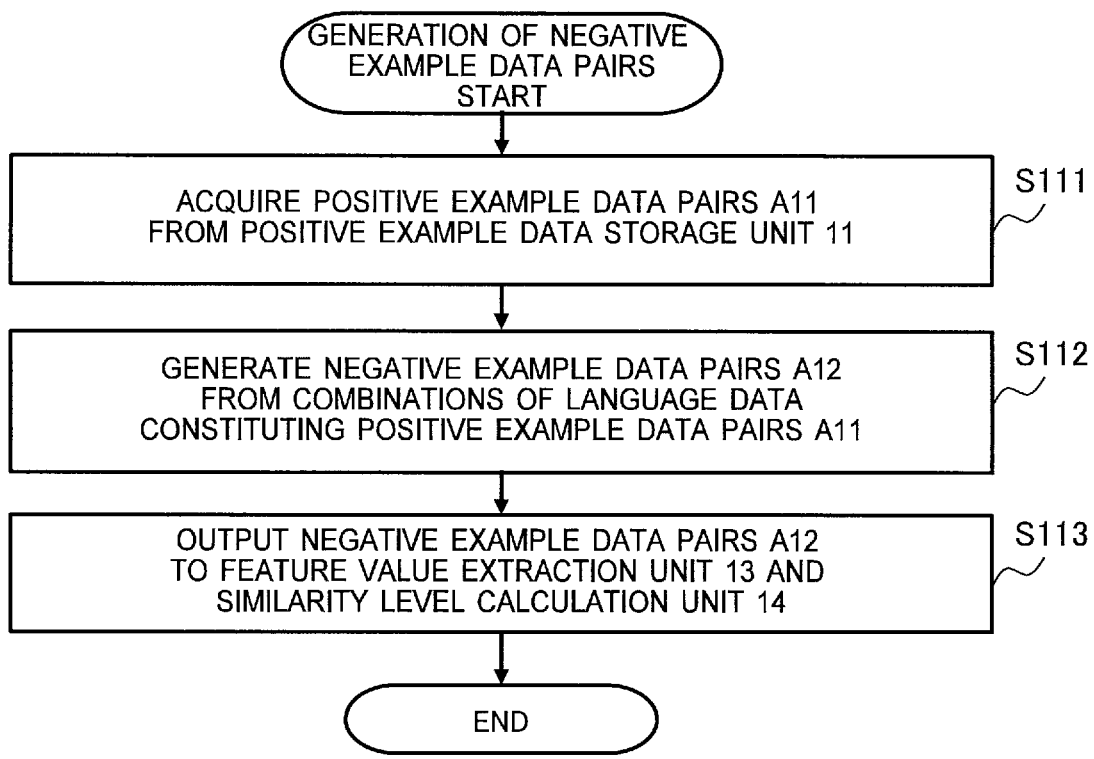
FIG. 4 is a flowchart showing an operation of a negative example data generation unit in the first embodiment.

FIG. 3 is a flowchart showing an operation of the semantic relationship learning device 1 according to the first embodiment. FIG. 4 is a flowchart showing an operation of the negative example data generation unit 12 in the first embodiment. First, the negative example data generation unit 12 acquires the plurality of positive example data pairs A11 from the positive example data storage unit 11 and thereby acquires the language data constituting each of the plurality of positive example data pairs A11 (step S11, step S111).

Subsequently, the negative example data generation unit 12 generates a plurality of negative example data pairs A12 by combining the language data acquired from the positive example data storage unit 11 (step S12, step S112). Each of the plurality of negative example data pairs A12 is formed with language data that are not in the synonymous relationship with each other. Put another way, the negative example data generation unit 12 generates the plurality of negative example data pairs A12 from combinations of language data other than the positive example data pairs A11. The negative example data generation unit 12 is desired to generate the plurality of negative example data pairs A12 from all combinations of language data other than the positive example data pairs A11. The negative example data generation unit 12 outputs the negative example data pairs A12 to the feature value extraction unit 13 and the similarity level calculation unit 14 (step S113).

Figure 5:
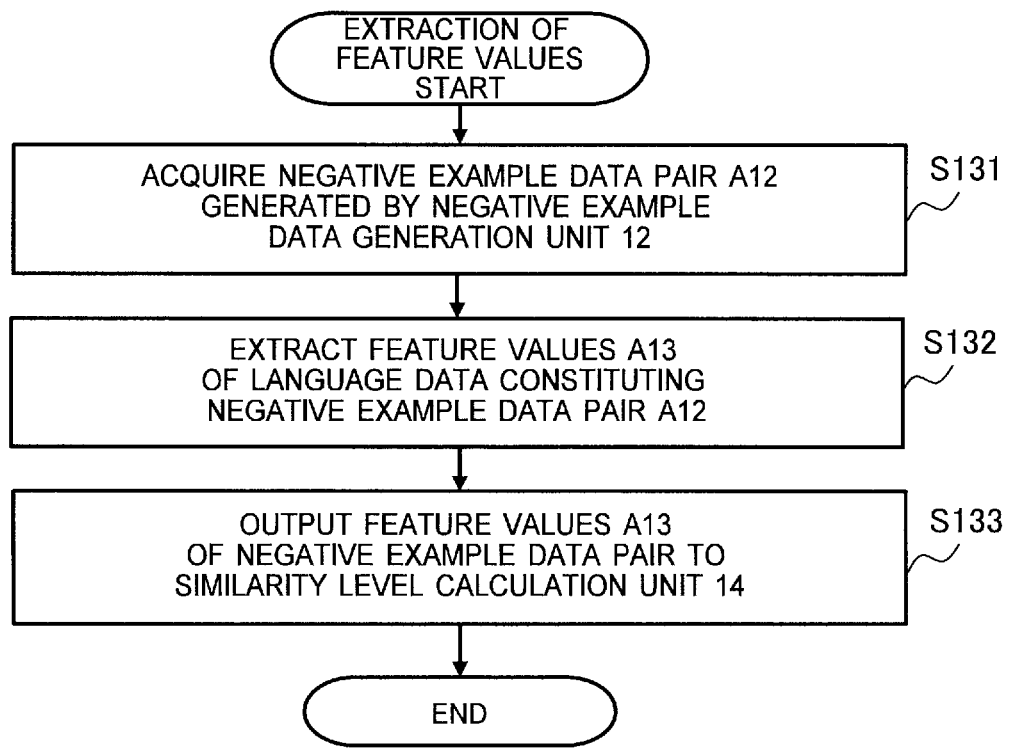
FIG. 5 is a flowchart showing an operation of a feature value extraction unit in the first embodiment.

FIG. 5 is a flowchart showing an operation of the feature value extraction unit 13 in the first embodiment. The feature value extraction unit 13 acquires the plurality of negative example data pairs A12 and extracts, namely, calculates, the feature values A13 from the language data constituting each of the plurality of negative example data pairs A12 (step S13, steps S131 and S132). The feature value extraction unit 13 outputs the feature values A13 to the similarity level calculation unit 14 (step S133).

Figure 6:
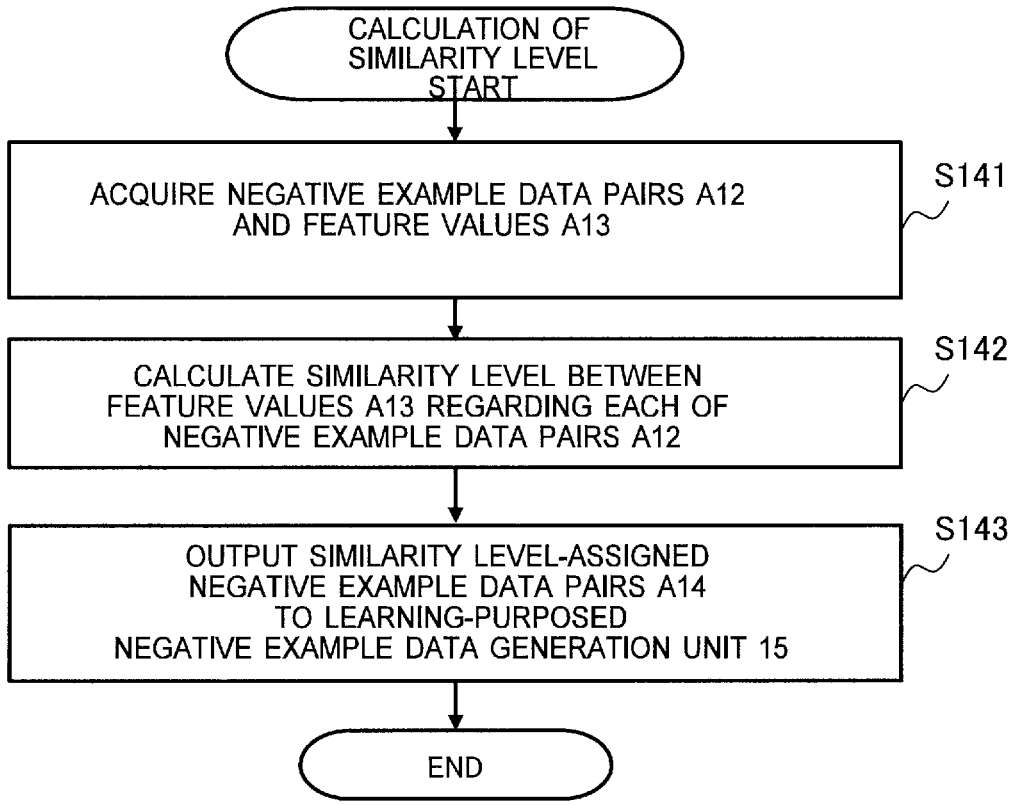
FIG. 6 is a flowchart showing an operation of a similarity level calculation unit in the first embodiment.

FIG. 6 is a flowchart showing an operation of the similarity level calculation unit 14 in the first embodiment. The similarity level calculation unit 14 acquires the plurality of negative example data pairs A12 and the plurality of feature values A13 and calculates the similarity level between the feature values A13 in each of the plurality of negative example data pairs A12 (step S14, steps S141 and S142). The similarity level calculation unit 14 assigns the similarity level to each negative example data pair and outputs the similarity level-assigned negative example data pairs A14 to the learning-purposed negative example data generation unit 15 (step S143).

Figure 7:
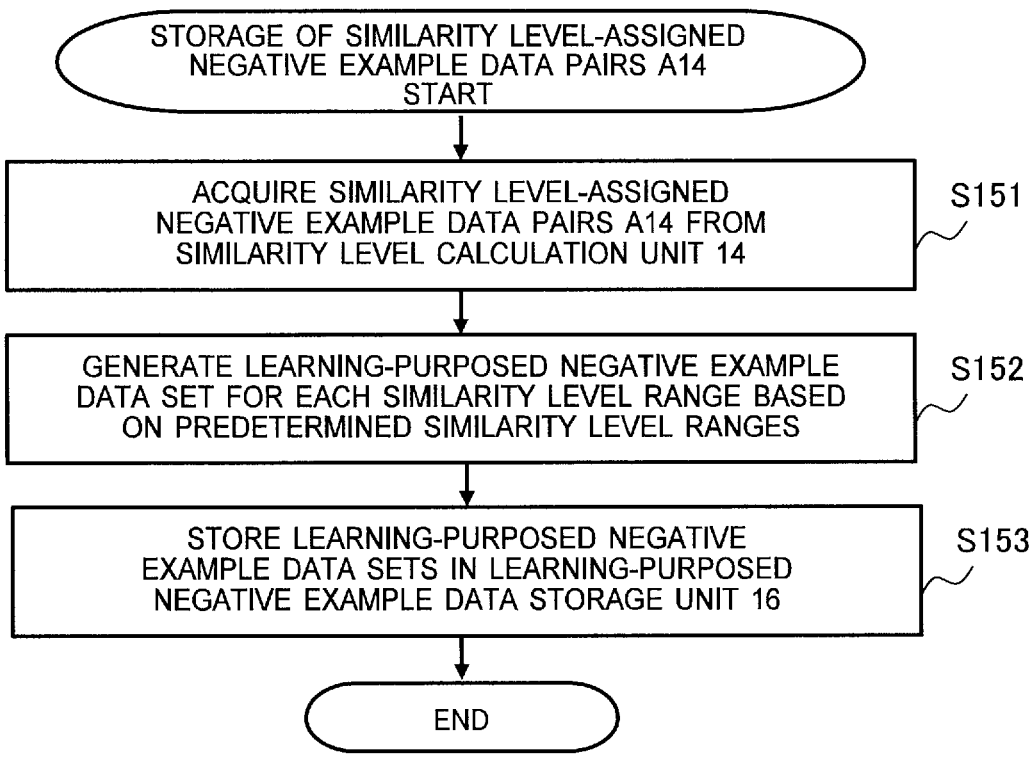
FIG. 7 is a flowchart showing an operation of a learning-purposed negative example data generation unit in the first embodiment.

FIG. 7 is a flowchart showing an operation of the learning-purposed negative example data generation unit 15 in the first embodiment. The learning-purposed negative example data generation unit 15 acquires a plurality of similarity level-assigned negative example data pairs A14, classifies the plurality of negative example data pairs A14 into a plurality of predetermined similarity level ranges, and thereby generates a plurality of learning-purposed negative example data sets A15 corresponding to the plurality of similarity level ranges (step S15, steps S151 and S152). Specifically, each of the plurality of learning-purposed negative example data sets A15 is a group of data including one or more negative example data pairs among the plurality of negative example data pairs A12. The plurality of learning-purposed negative example data sets A15 corresponding to the plurality of similarity level ranges are stored in the learning-purposed negative example data storage unit 16 (step S153).

Figure 8:
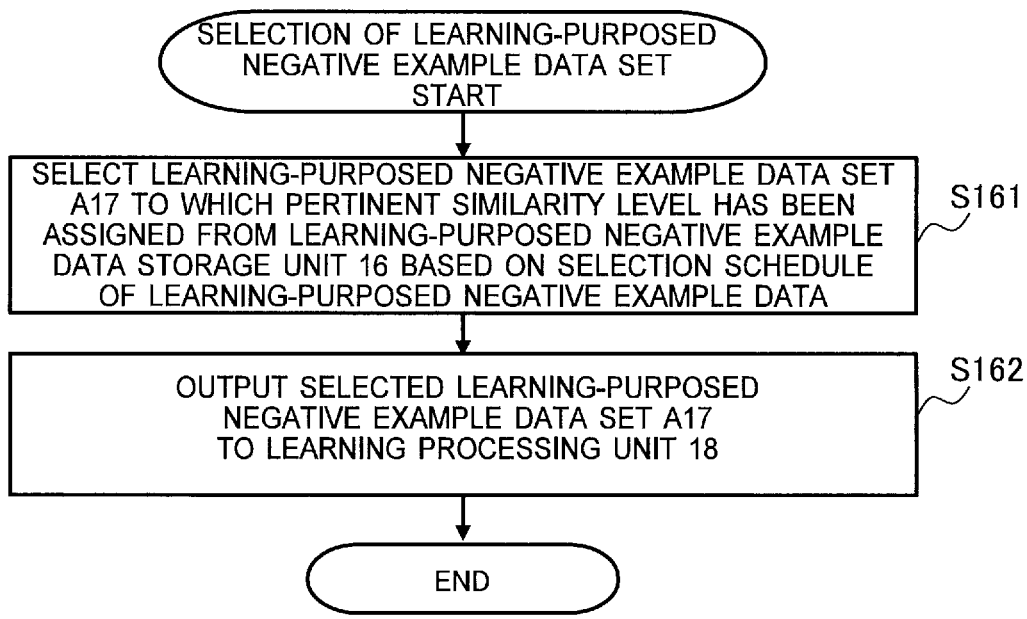
FIG. 8 is a flowchart showing an operation of a learning data set selection unit in the first embodiment.

FIG. 8 is a flowchart showing an operation of the learning data set selection unit 17 in the first embodiment. The learning data set selection unit 17 selects a learning-purposed negative example data set A17 from the plurality of learning-purposed negative example data sets A16 stored in the learning-purposed negative example data storage unit 16 in the order according to the selection schedule predetermined based on the plurality of similarity level ranges (step S16, step S161). The selected learning-purposed negative example data set A17 is outputted to the learning processing unit 18 (step S162).

Figure 9:
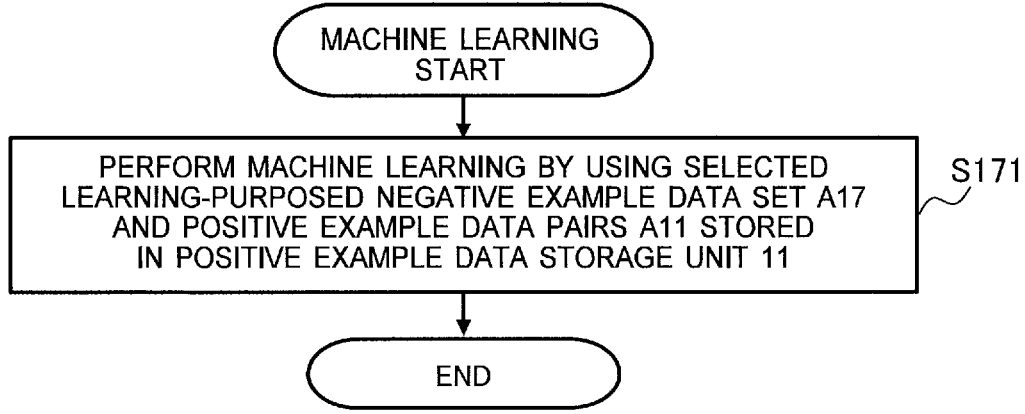
FIG. 9 is a flowchart showing an operation of a learning processing unit in the first embodiment.

FIG. 9 is a flowchart showing an operation of the learning processing unit 18 in the first embodiment. The learning processing unit 18 performs the machine learning process by using the selected learning-purposed negative example data set A17 and the plurality of positive example data pairs A11 stored in the positive example data storage unit 11 (step S17, step S171). The processing of the steps S16 and S17 in FIG. 3 is repeated until the selection schedule of the learning-purposed negative example data sets is over (step S18).

(1-3) Effect of First Embodiment

As described above, with the semantic relationship learning device 1, the semantic relationship learning method or the semantic relationship learning program according to the first embodiment, it is possible to perform a machine learning process that enables excellent semantic relationship discrimination.

Specifically, negative example data pairs A14 obtained in consideration of the similarity level are prepared previously, learning by using a negative example data pair formed with language data whose similarity level is low is performed first, and learning by using a negative example data pair formed with language data whose similarity level is the next lowest is performed subsequently. In other words, the learning is advanced gradually to problem settings at higher difficulty levels (i.e., problem settings using the negative example data pairs formed with language data whose similarity levels are higher). With this method, the generalization performance can be improved as well as making it possible to quickly converge on a good solution.

(2) Second Embodiment (2-1) Configuration of Second Embodiment

Figure 10:
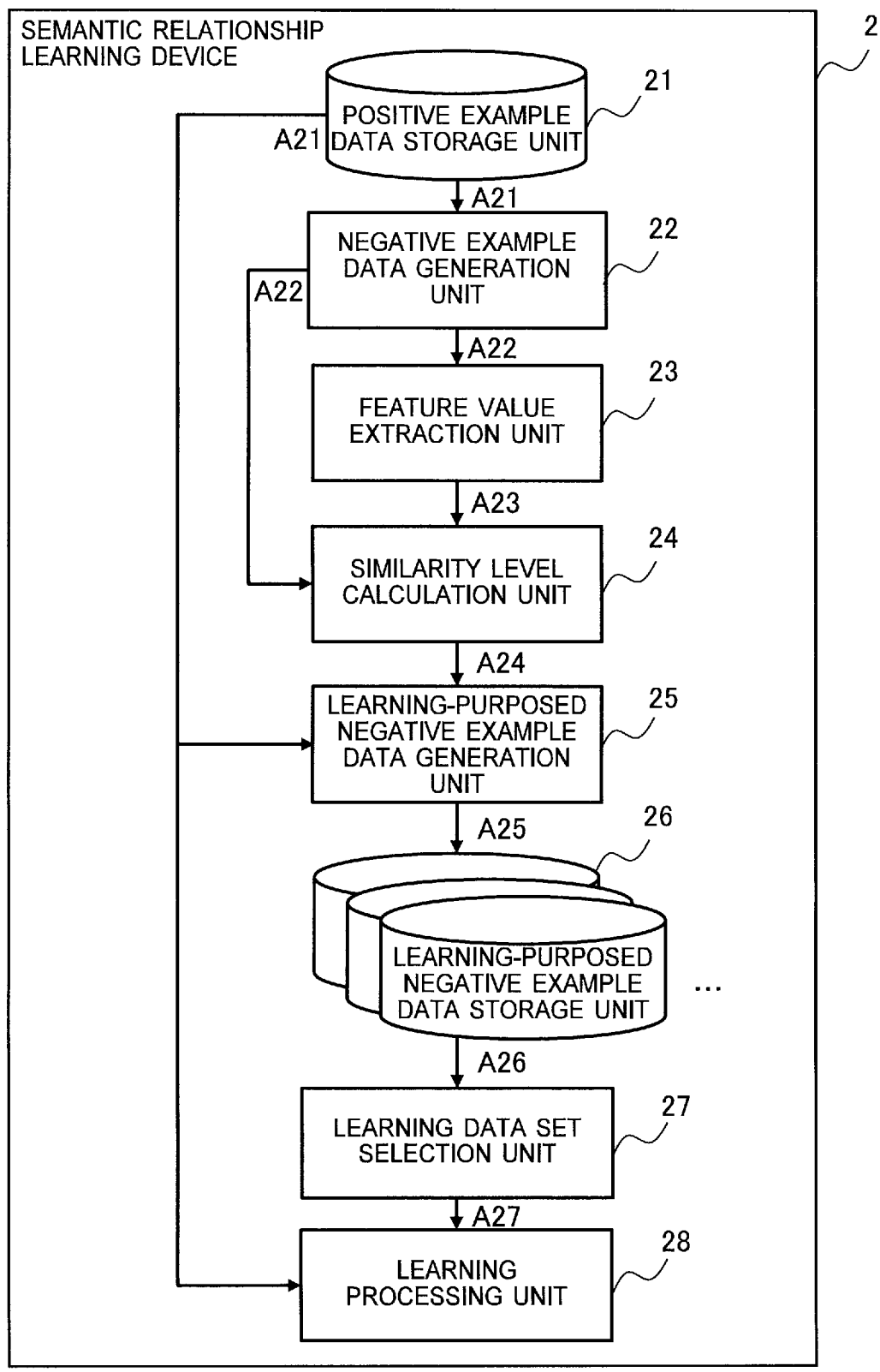
FIG. 10 is a functional block diagram schematically showing a configuration of a semantic relationship learning device according to a second embodiment of the present invention.

FIG. 10 is a functional block diagram schematically showing a configuration of a semantic relationship learning device 2 according to a second embodiment of the present invention. The semantic relationship learning device 2 is a device capable of executing a semantic relationship learning method according to the second embodiment. As shown in FIG. 10, the semantic relationship learning device 2 includes a negative example data generation unit 22, a feature value extraction unit 23, a similarity level calculation unit 24, a learning-purposed negative example data generation unit 25, a learning data set selection unit 27 and a learning processing unit 28. Further, the semantic relationship learning device 2 may include a positive example data storage unit 21 and a learning-purposed negative example data storage unit 26. The second embodiment will be described below focusing on differences from the first embodiment.

The positive example data storage unit 21 stores a plurality of positive example data pairs A21. Each of the plurality of positive example data pairs is formed with language data that are in a predetermined semantic relationship with each other. In the second embodiment, the predetermined semantic relationship is a relationship of a question sentence and an answer sentence. The language data in the predetermined semantic relationship with each other are, for example, question sentence data and answer sentence data. Incidentally, the predetermined semantic relationship is not limited to the relationship of a question sentence and an answer sentence.

The negative example data generation unit 22 acquires the plurality of positive example data pairs A21 stored in the positive example data storage unit 21. The negative example data generation unit 22 generates a plurality of negative example data pairs A22 by combining language data included in the language data constituting the plurality of positive example data pairs A21. Each of the plurality of negative example data pairs A22 is formed with language data that are not in the predetermined semantic relationship with each other. In the second embodiment, each of the plurality of negative example data pairs A22 is formed with language data that are not in the relationship of a question sentence and an answer sentence with each other. The negative example data pair A22 is, for example, a data pair formed with a question sentence and a question sentence or a data pair formed with an answer sentence and an answer sentence.

The feature value extraction unit 23 extracts, namely, calculates, feature values A23 from the language data constituting each of the plurality of negative example data pairs A22 generated by the negative example data generation unit 22. Similarly to the first embodiment, a feature value that is suitable for the similarity level used, the properties of the language data, etc. can be used as the feature value.

The similarity level calculation unit 24 calculates the similarity level between the feature values A23 in each of the plurality of negative example data pairs A22. The similarity level calculation unit 24 assigns the calculated similarity level to the negative example data pair A22 corresponding to the similarity level and thereby generates a similarity level-assigned negative example data pair A24. As the similarity level, the same similarity level as in the first embodiment can be used.

The learning-purposed negative example data generation unit 25 generates a plurality of learning-purposed negative example data pairs by replacing question sentence data in each positive example data pair A21 stored in the positive example data storage unit 21 with question sentence data included in a similarity level-assigned negative example data pair A24 generated by the similarity level calculation unit 24, or replacing answer sentence data in each positive example data pair A21 stored in the positive example data storage unit 21 with answer sentence data included in a similarity level-assigned negative example data pair A24 generated by the similarity level calculation unit 24. The learning-purposed negative example data generation unit 25 classifies the language data constituting the plurality of learning-purposed negative example data pairs into a plurality of predetermined similarity level ranges based on the similarity levels calculated by the similarity level calculation unit 24 and thereby generates a plurality of learning-purposed negative example data sets A25 corresponding to the plurality of similarity level ranges. Each of the plurality of learning-purposed negative example data sets A25 includes one or more negative example data pairs among the plurality of similarity level-assigned learning-purposed negative example data pairs A24.

For example, a description will be given here of a case where the learning-purposed negative example data generation unit 25 generates a learning-purposed negative example data pair formed with "question sentence data D11" and "answer sentence data D20" from a positive example data pair formed with "question sentence data D10" and the "answer sentence data D20" by using a negative example data pair formed with the "question sentence data D10" and the "question sentence data D11". In this case, the learning-purposed negative example data generation unit 25 generates the learning-purposed negative example data pair formed with the "question sentence data D11" and the "answer sentence data D20" by replacing the "question sentence data D10" in the positive example data pair with the "question sentence data D11" in the negative example data pair. At that time, the similarity level that has been assigned to the negative example data pair formed with the "question sentence data D10" and the "question sentence data D11" is assigned to the generated learning-purposed negative example data pair.

Further, for example, a description will be given here of a case where the learning-purposed negative example data generation unit 25 generates a learning-purposed negative example data pair formed with "question sentence data D10" and "answer sentence data D21" from a positive example data pair formed with the "question sentence data D10" and "answer sentence data D20" by using a negative example data pair formed with the "answer sentence data D20" and the "answer sentence data D21". In this case, the learning-purposed negative example data generation unit 25 generates the learning-purposed negative example data pair formed with the "question sentence data D10" and the "answer sentence data D21" by replacing the "answer sentence data D20" in the positive example data pair with the "answer sentence data D21" in the negative example data pair. At that time, the similarity level that has been assigned to the negative example data pair formed with the "answer sentence data D20" and the "answer sentence data D21" is assigned to the generated learning-purposed negative example data pair.

For example, the similarity level between a "question sentence A" and a "question sentence B" constituting a negative example data pair generated by the negative example data generation unit 22 will be explained below. The similarity level calculation unit 24 converts text data of the "question sentence A" and text data of the "question sentence B" respectively to multidimensional vectors, calculates Euclidean distance d2 between the texts based on the multidimensional vectors, and determines the Euclidean distance d2 obtained by the calculation as the similarity level. By performing such processing, a similarity level-assigned learning-purposed negative example data pair formed with a "question sentence" and an "answer sentence" is generated.

Based on the calculated Euclidean distance d2, the learning-purposed negative example data generation unit 25 generates the learning-purposed negative example data sets A25 by classifying the learning-purposed negative example data pairs each formed with a "question sentence" and an "answer sentence" into ranges of the Euclidean distance d2. Here, the ranges of the Euclidean distance d2 as the similarity level ranges are, for example, a first similarity level range as a range of $0.1 \leq d2 < 0.3$, a second similarity level range as a range of $0.3 \leq d2 < 0.5$, and a third similarity level range as a range of $0.5 \leq d2 \leq 0.7$. This example is an example of a case where the learning-purposed negative example data pairs are classified into three data sets corresponding to the similarity level ranges. Incidentally, the widths of the similarity level ranges of the learning-purposed negative example data sets generated and the number of the similarity level ranges are not limited to the above-described example.

The learning-purposed negative example data storage unit 26 receives the plurality of learning-purposed negative example data sets A25 corresponding to the plurality of similarity level ranges generated by the learning-purposed negative example data generation unit 25, and stores the plurality of learning-purposed negative example data sets A25 as a plurality of learning-purposed negative example data sets A26.

The learning data set selection unit 27 selects a learning-purposed negative example data set A27 from the plurality of learning-purposed negative example data sets A26 stored in the learning-purposed negative example data storage unit 26 in an order according to a selection schedule predetermined based on the plurality of similarity level ranges.

Specifically, the learning data set selection unit 27 successively outputs the learning-purposed negative example data sets to the learning processing unit 28, starting from a learning-purposed negative example data set whose similarity level of the similarity level range is low, and the learning process in the learning processing unit 28 is executed. When one learning process is over, a learning-purposed negative example data set whose similarity level is higher is subsequently outputted to the learning processing unit 28 and the process is repeated in the same order until the selection schedule of the learning-purposed negative example data sets is over.

Put another way, the learning data set selection unit 27 determines the selection schedule so that a learning-purposed negative example data set corresponding to a similarity level range having the lowest (i.e., minimum) value among the plurality of similarity level ranges is selected first and subsequently a learning-purposed negative example data set corresponding to a similarity level range having the second lowest value among the plurality of similarity level ranges is selected second. Namely, let n represent an integer larger than or equal to 1, the learning data set selection unit 27 determines the selection schedule so that a learning-purposed negative example data set corresponding to a similarity level range having the n-th lowest value among the plurality of similarity level ranges is selected n-th.

By starting the learning from a learning-purposed negative example data set whose similarity level is low and gradually learning learning-purposed negative example data sets whose similarity levels are higher as above, the semantic relationship learning device 2 can quickly converge on a good solution. Further, the generalization performance of the semantic relationship discrimination model obtained by the semantic relationship learning device 2 can be improved. Incidentally, in the selection schedule of the learning-purposed negative example data sets, an arbitrary number of times of the learning may be set. It is also possible to use the result of optimization by means of Bayesian optimization or the like for the determination of the selection schedule of the learning-purposed negative example data sets in order to achieve the highest accuracy of the semantic relationship learning device 2.

Specifically, in the learning for the semantic relationship discrimination of electronic data, learning-purposed negative example data pairs obtained in consideration of the similarity level are prepared previously, learning with an easy problem setting at a low difficulty level (e.g., problem using a learning-purposed negative example data pair formed with language data whose similarity level is low) is performed first, and learning with a problem setting at a high difficulty level (e.g., problem using a learning-purposed negative example data pair formed with language data whose similarity level is high) is performed later. With this method, the generalization performance of a semantic relationship discrimination device including the semantic relationship learning device 2 can be improved as well as enabling the semantic relationship learning device 2 to quickly converge on a good solution.

The learning processing unit 28 performs the machine learning process by using the learning-purposed negative example data set A27 selected by the learning data set selection unit 27 and the plurality of positive example data pairs A21 stored in the positive example data storage unit 21. The function of the learning processing unit 28 is the same as the function of the learning processing unit 18 in the first embodiment.

Further, the hardware configuration of the semantic relationship learning device 2 according to the second embodiment is the same as the hardware configuration shown in FIG. 2.

(2-2) Operation of Second Embodiment

Figure 11:
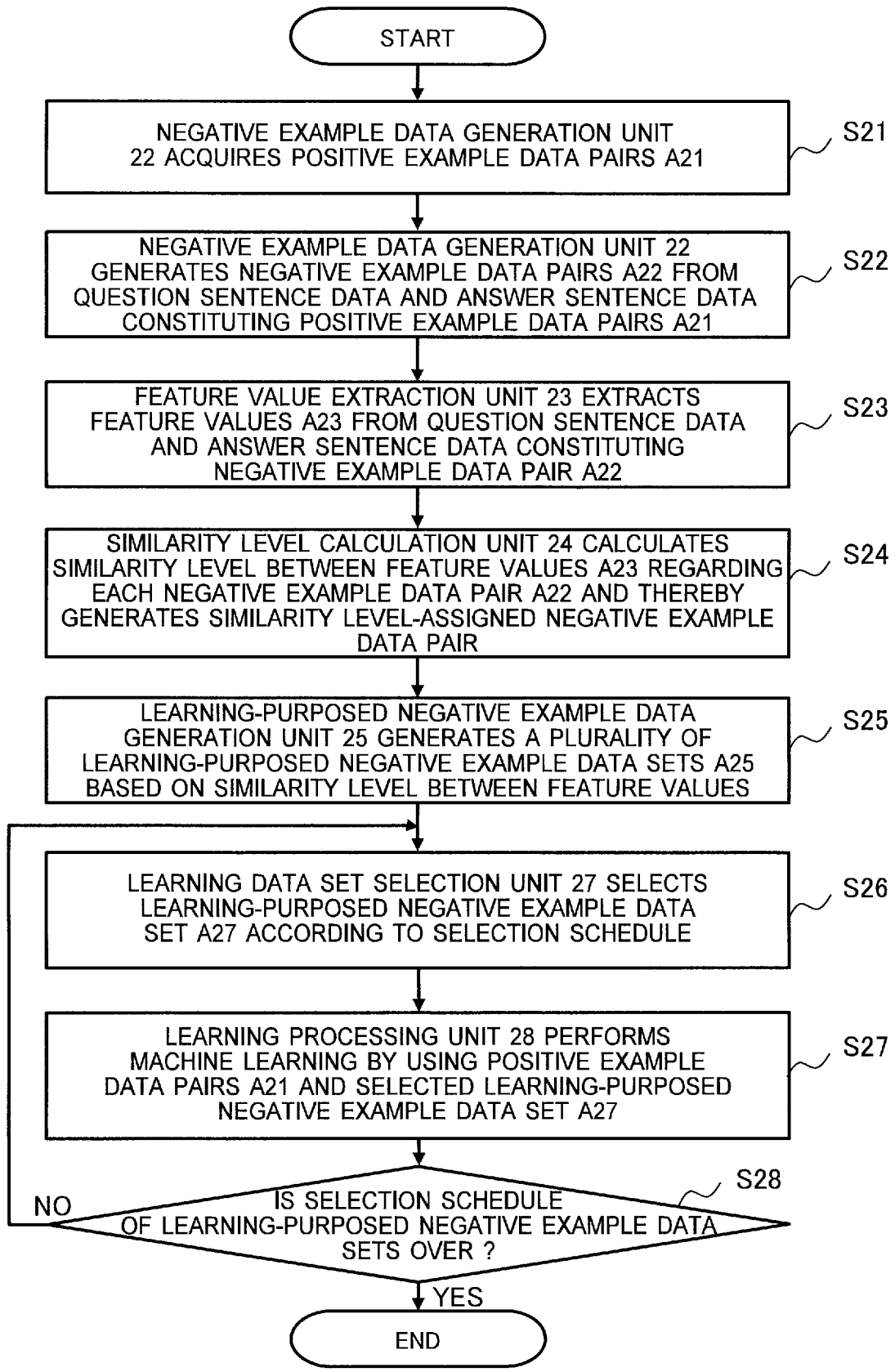
FIG. 11 is a flowchart showing an operation of the semantic relationship learning device according to the second embodiment.
Figure 12:
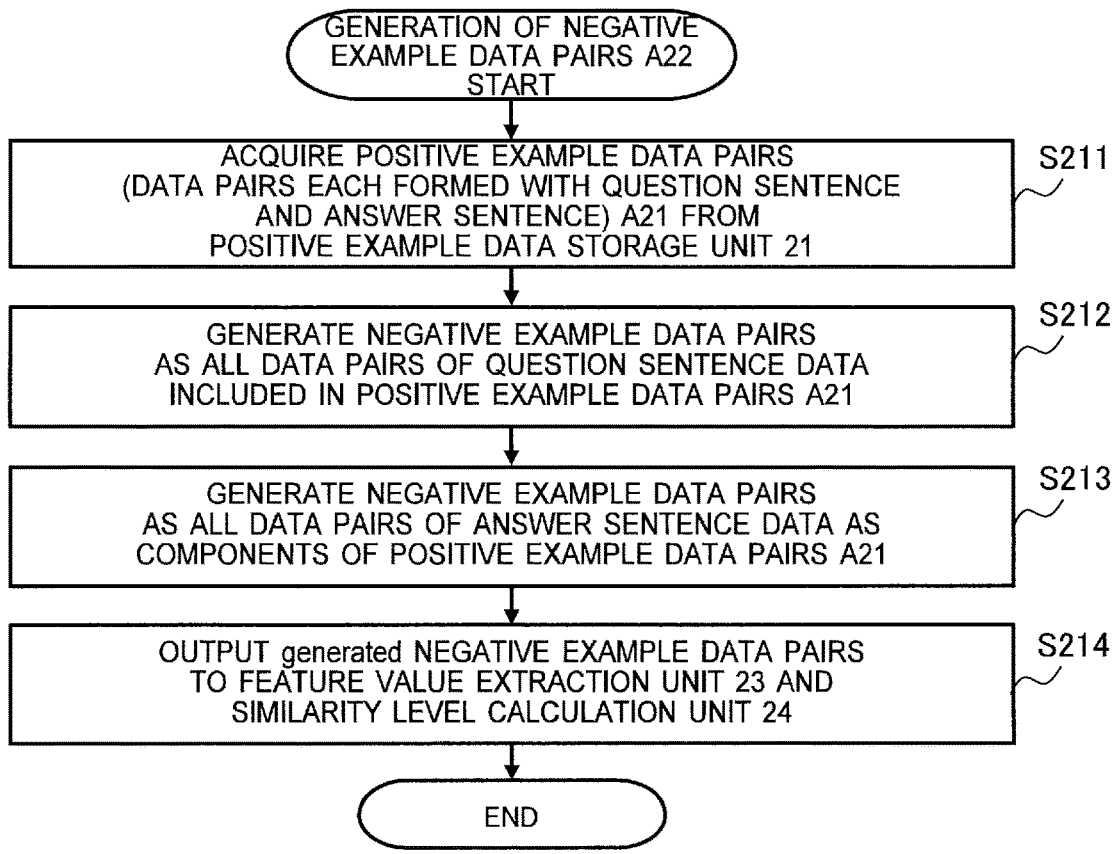
FIG. 12 is a flowchart showing an operation of a negative example data generation unit in the second embodiment.

FIG. 11 is a flowchart showing an operation of the semantic relationship learning device 2 according to the second embodiment. FIG. 12 is a flowchart showing an operation of the negative example data generation unit 22 in the second embodiment. First, the negative example data generation unit 22 acquires the plurality of positive example data pairs A21 from the positive example data storage unit 21 and thereby acquires the question sentence data and the answer sentence data as the language data constituting each of the plurality of positive example data pairs A21 (step S21, step S211).

Subsequently, the negative example data generation unit 22 generates a plurality of negative example data pairs A22 by combining question sentence data acquired from the positive example data storage unit 21 with each other and combining answer sentences acquired from the positive example data storage unit 21 with each other (step S22, steps S212 and S213). Each of the plurality of negative example data pairs A22 is formed with a pair of language data that are not in the predetermined semantic relationship. Put another way, the negative example data generation unit 22 generates the plurality of negative example data pairs A22 from combinations of language data other than the positive example data pairs A21. The negative example data generation unit 22 outputs the negative example data pairs A22 to the feature value extraction unit 23 and the similarity level calculation unit 24 (step S214).

Figure 13:
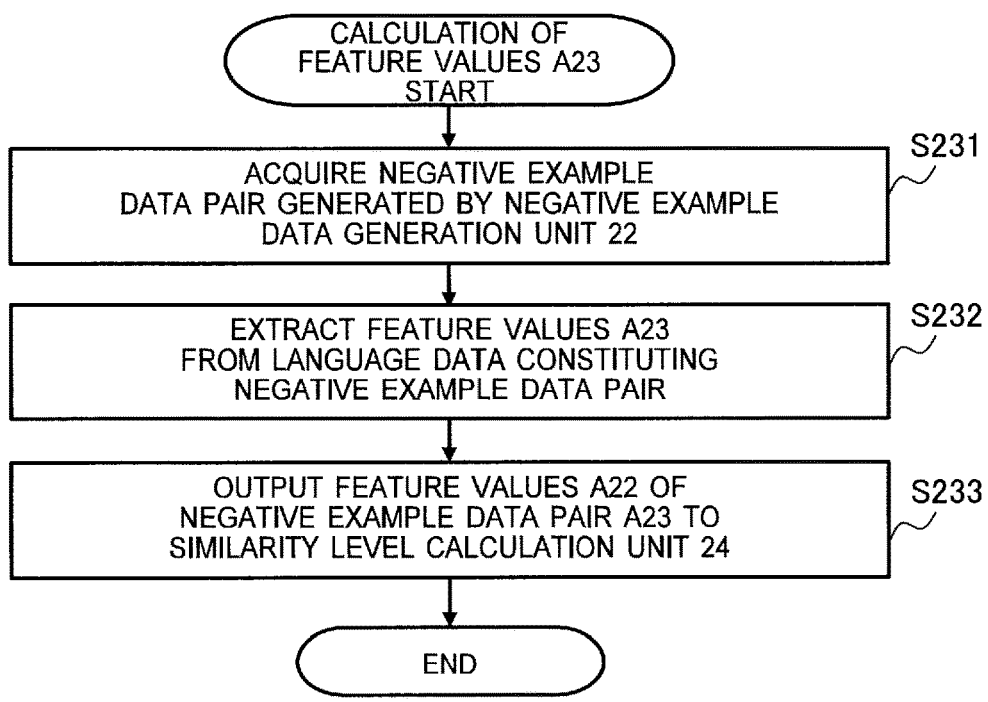
FIG. 13 is a flowchart showing an operation of a feature value extraction unit in the second embodiment.

FIG. 13 is a flowchart showing an operation of the feature value extraction unit 23 in the second embodiment. The feature value extraction unit 23 acquires the plurality of negative example data pairs A22 and extracts, namely, calculates, the feature values A23 from the language data constituting each of the plurality of negative example data pairs A22 (step S23, steps S231 and S232). The feature value extraction unit 23 outputs the feature values A23 to the similarity level calculation unit 24 (step S233).

Figure 14:
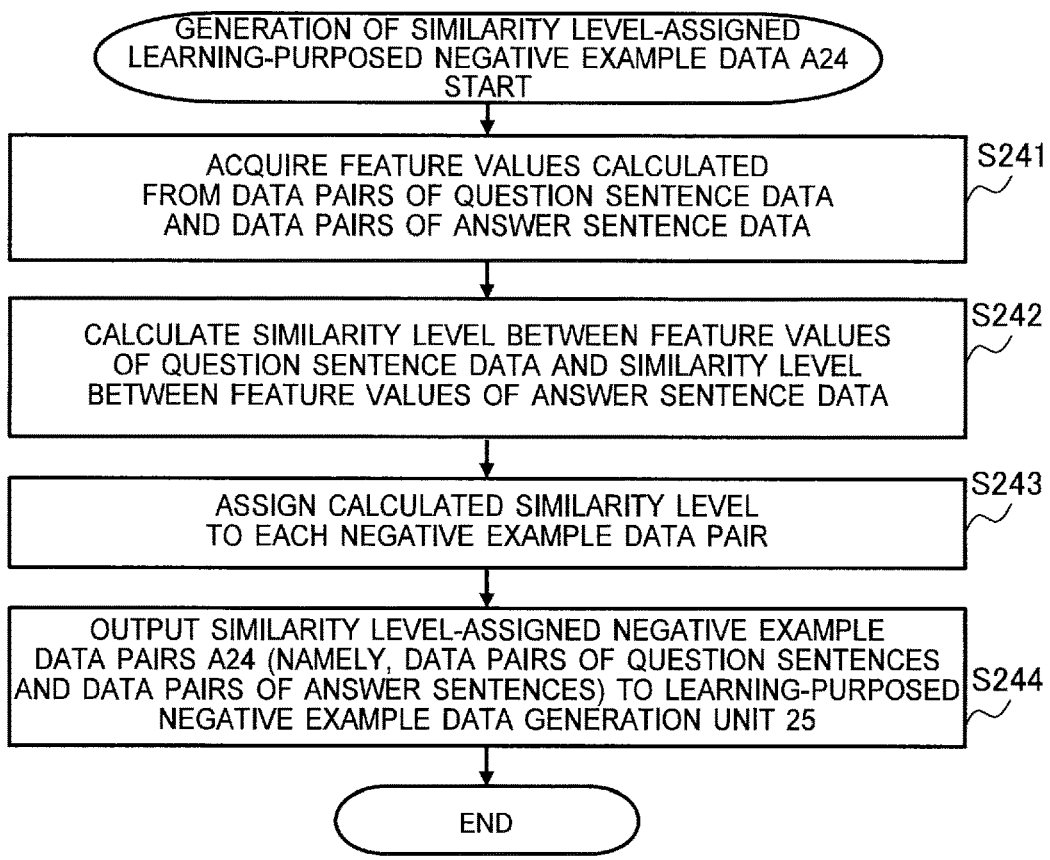
FIG. 14 is a flowchart showing an operation of a similarity level calculation unit in the second embodiment.

FIG. 14 is a flowchart showing an operation of the similarity level calculation unit 24 in the second embodiment. The similarity level calculation unit 24 acquires the plurality of negative example data pairs A22 and the plurality of feature values A23 and calculates the similarity level between the feature values A23 in each of the plurality of negative example data pairs A22 (step S24, steps S241 and S242). The similarity level calculation unit 24 assigns the similarity level to each negative example data pair and outputs the similarity level-assigned negative example data pairs A24 to the learning-purposed negative example data generation unit 25 (step S24, steps S243 and S244).

Figure 15:
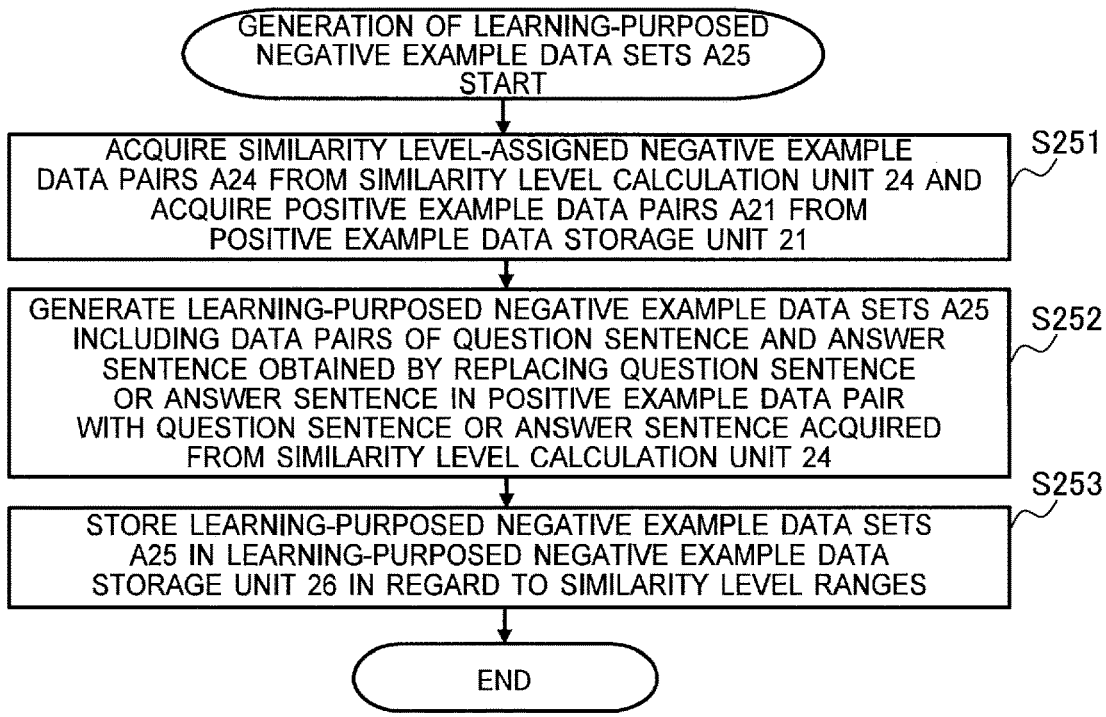
FIG. 15 is a flowchart showing an operation of a learning-purposed negative example data generation unit in the second embodiment.

FIG. 15 is a flowchart showing an operation of the learning-purposed negative example data generation unit 25 in the second embodiment. Based on the similarity level, the learning-purposed negative example data generation unit 25 classifies a plurality of learning-purposed negative example data pairs generated from the language data constituting the plurality of negative example data pairs A24 and the language data constituting the plurality of positive example data pairs A21 into a plurality of predetermined similarity level ranges, and thereby generates a plurality of learning-purposed negative example data sets A25 (step S25, steps S251 and S252). Specifically, each of the plurality of learning-purposed negative example data sets A25 is a group of data including one or more negative example data pairs among the plurality of negative example data pairs A22. The plurality of learning-purposed negative example data sets A25 corresponding to the plurality of similarity level ranges are stored in the learning-purposed negative example data storage unit 26 (step S253).

The operation of the learning data set selection unit 27 and the learning processing unit 28 is the same as the operation of the learning data set selection unit 17 and the learning processing unit 18 in the first embodiment.

(2-3) Effect of Second Embodiment

As described above, with the semantic relationship learning device 2, the semantic relationship learning method or the semantic relationship learning program according to the second embodiment, it is possible to perform a machine learning process that enables excellent semantic relationship discrimination.

Specifically, negative example data pairs A24 obtained in consideration of the similarity level are prepared previously, learning by using a learning-purposed negative example data pair set of the negative example data pairs constituting the language data whose similarity level is low is performed first, and learning by using a learning-purposed negative example data pair set of the negative example data pairs constituting the language data whose similarity level is the next lowest is performed subsequently. In other words, the learning is advanced gradually to problem settings at higher difficulty levels (i.e., problem settings using the negative example data pair set of the negative example data pairs constituting the language data whose similarity levels are higher). With this method, the generalization performance can be improved as well as making it possible to quickly converge on a good solution.

DESCRIPTION OF REFERENCE CHARACTERS

1, 2: semantic relationship learning device, 11, 21: positive example data storage unit, 12, 22: negative example data generation unit, 13, 23: feature value extraction unit, 14, 24: similarity level calculation unit, 15, 25: learning-purposed negative example data generation unit, 16, 26: learning-purposed negative example data storage unit, 17, 27: learning data set selection unit, 18, 28: learning processing unit.

What is claimed is:

1. A semantic relationship learning device comprising:
    processing circuitry
    to acquire a plurality of positive example data pairs each of which is formed with language data that are in a predetermined semantic relationship with each other from a positive example data storage storing the plurality of positive example data pairs and to generate a plurality of negative example data pairs by combining each of the language data constituting the plurality of positive example data pairs, each of the plurality of negative example data pairs being formed with language data that are not in the predetermined semantic relationship with each other;
    to extract feature values from the language data constituting each of the plurality of negative example data pairs;
    to calculate a similarity level between the feature values of the language data in each of the plurality of negative example data pairs;
    to classify a plurality of learning-purposed negative example data pairs generated from the language data constituting the plurality of negative example data pairs and the language data constituting the plurality of positive example data pairs into a plurality of predetermined similarity level ranges based on the similarity level, thereby generating a plurality of learning-purposed negative example data sets corresponding to the plurality of similarity level ranges, each of the plurality of learning-purposed negative example data sets including one or more negative example data pairs among the plurality of negative example data pairs;
    to select a learning-purposed negative example data set from the plurality of learning-purposed negative example data sets in an order according to a selection schedule predetermined based on the plurality of similarity level ranges; and
    to perform a machine learning process by using the selected learning-purposed negative example data set and the plurality of positive example data pairs.

2. The semantic relationship learning device according to claim 1, wherein
    the language data that are in the predetermined semantic relationship are language data that are in a synonymous relationship with each other,
    the language data that are not in the predetermined semantic relationship are language data that are not in the synonymous relationship with each other, and
    the processing circuitry generates the plurality of learning-purposed negative example data sets by classifying the plurality of negative example data pairs into the plurality of predetermined similarity level ranges based on the similarity level.

3. The semantic relationship learning device according to claim 2, wherein let n represent an integer larger than or equal to 1, the processing circuitry determines the selection schedule so that a learning-purposed negative example data set corresponding to a similarity level range having an n-th lowest value among the plurality of similarity level ranges is selected n-th.

4. The semantic relationship learning device according to claim 1, wherein
    the language data that are in the predetermined semantic relationship are language data representing a question sentence and language data representing an answer sentence,
    the language data that are not in the predetermined semantic relationship are first language data representing a question sentence and second language data representing a question sentence, or third language data representing an answer sentence and fourth language data representing an answer sentence, and
    the processing circuitry generates the plurality of learning-purposed negative example data sets by classifying the plurality of learning-purposed negative example data pairs generated from the plurality of negative example data pairs and the plurality of positive example data pairs into the plurality of predetermined similarity level ranges based on the similarity level.

5. The semantic relationship learning device according to claim 1, wherein
    the language data that are in the predetermined semantic relationship are language data representing a question sentence and language data representing an answer sentence,
    the language data that are not in the predetermined semantic relationship are first language data representing a question sentence and second language data representing a question sentence, or third language data representing an answer sentence and fourth language data representing an answer sentence, and
    the processing circuitry generates the plurality of learning-purposed negative example data sets by classifying the plurality of learning-purposed negative example data pairs, generated by replacing question sentence data in each of the plurality of positive example data pairs with the first language data or the second language data in a negative example data pair among the plurality of negative example data pairs or replacing answer sentence data in each of the plurality of positive example data pairs with the third language data or the fourth language data in a negative example data pair among the plurality of negative example data pairs, into the plurality of predetermined similarity level ranges.

6. The semantic relationship learning device according to claim 4, wherein let n represent an integer larger than or equal to 1, the processing circuitry determines the selection schedule so that a learning-purposed negative example data set corresponding to a similarity level range having an n-th lowest value among the plurality of similarity level ranges is selected n-th.

7. The semantic relationship learning device according to claim 1, further comprising the positive example data storage storing the plurality of positive example data pairs.

8. The semantic relationship learning device according to claim 1, further comprising a learning-purposed negative example data storage that stores the generated plurality of learning-purposed negative example data sets.

9. The semantic relationship learning device according to claim 1, further comprising a storage that stores a result of the machine learning process performed by the learning processing unit.

10. A semantic relationship learning method comprising:
    acquiring a plurality of positive example data pairs each of which is formed with language data that are in a predetermined semantic relationship with each other from a positive example data storage that stores the plurality of positive example data pairs and generating a plurality of negative example data pairs by combining each of the language data constituting the plurality of positive example data pairs, each of the plurality of negative example data pairs being formed with language data that are not in the predetermined semantic relationship with each other;

extracting feature values from the language data constituting each of the plurality of negative example data pairs;

calculating a similarity level between the feature values of the language data in each of the plurality of negative example data pairs;

classifying a plurality of learning-purposed negative example data pairs generated from the language data constituting the plurality of negative example data pairs and the language data constituting the plurality of positive example data pairs into a plurality of predetermined similarity level ranges based on the similarity level, thereby generating a plurality of learning-purposed negative example data sets corresponding to the plurality of similarity level ranges, each of the plurality of learning-purposed negative example data sets including one or more negative example data pairs among the plurality of negative example data pairs;

selecting a learning-purposed negative example data set from the plurality of learning-purposed negative example data sets in an order according to a selection schedule predetermined based on the plurality of similarity level ranges; and performing a machine learning process by using the selected learning-purposed negative example data set and the plurality of positive example data pairs.

11. A non-transitory computer-readable storage medium for storing a semantic relationship learning program that causes a computer to execute:

acquiring a plurality of positive example data pairs each of which is formed with language data that are in a predetermined semantic relationship with each other from a positive example data storage that stores the plurality of positive example data pairs and generating a plurality of negative example data pairs by combining each of the language data constituting the plurality of positive example data pairs, each of the plurality of negative example data pairs being formed with language data that are not in the predetermined semantic relationship with each other;

extracting feature values from the language data constituting each of the plurality of negative example data pairs;

calculating a similarity level between the feature values of the language data in each of the plurality of negative example data pairs;

classifying a plurality of learning-purposed negative example data pairs generated from the language data constituting the plurality of negative example data pairs and the language data constituting the plurality of positive example data pairs into a plurality of predetermined similarity level ranges based on the similarity level, thereby generating a plurality of learning-purposed negative example data sets corresponding to the plurality of similarity level ranges, each of the plurality of learning-purposed negative example data sets including one or more negative example data pairs among the plurality of negative example data pairs;

selecting a learning-purposed negative example data set from the plurality of learning-purposed negative example data sets in an order according to a selection schedule predetermined based on the plurality of similarity level ranges; and performing a machine learning process by using the selected learning-purposed negative example data set and the plurality of positive example data pairs.

\* \* \* \* \*